Oct. 24, 1933. E. C. SMALLY Re. 18,974

INCANDESCENT LAMP

Original Filed March 11, 1931

Inventor:
E. C. Smally,
By Jas. L. Skidmore
Att'y.

Reissued Oct. 24, 1933 Re. 18,974

UNITED STATES PATENT OFFICE 18,974

INCANDESCENT LAMP

Emanuel C. Smally, Canton, Ohio

Original No. 1,906,188, dated April 25, 1933, Serial No. 521,645, March 11, 1931. Application for reissue June 8, 1933. Serial No. 674,958

7 Claims. (Cl. 240—41.35)

The invention relates to incandescent electric lamp bulbs, and more particularly to a bulb having a replaceable filament, and having a reflector incorporated therewith, whereby the capacity of the lamp for illumination is materially increased.

An object of the improvement is to provide an incandescent lamp provided with a socket arranged to detachably receive a plug or base carrying the filament.

Another object is to provide an incandescent lamp having a reflector incorporated therein and forming the rear portion of the lamp bulb.

A further object is to provide an incandescent lamp in which a portion of the bulb may be removed to remove a burned out filament and to replace the same with a new filament or with a small bulb.

Figure 2:
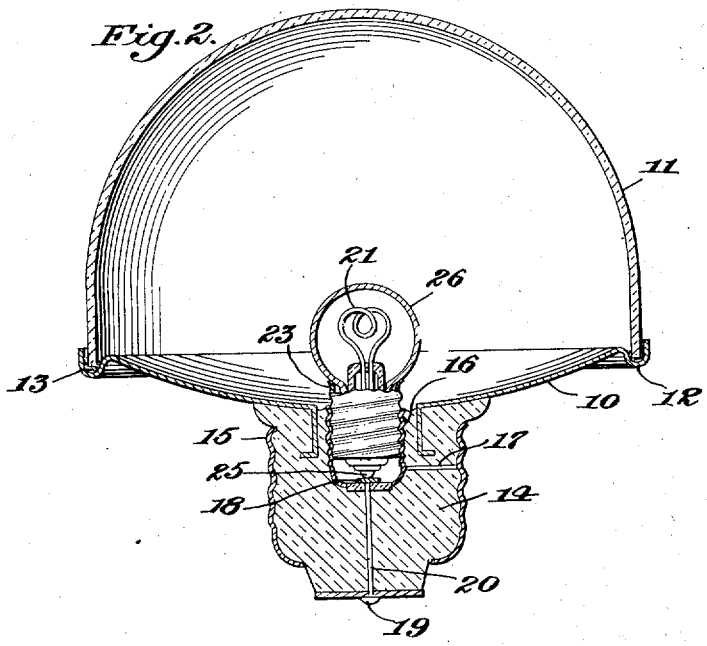
Figure 1:
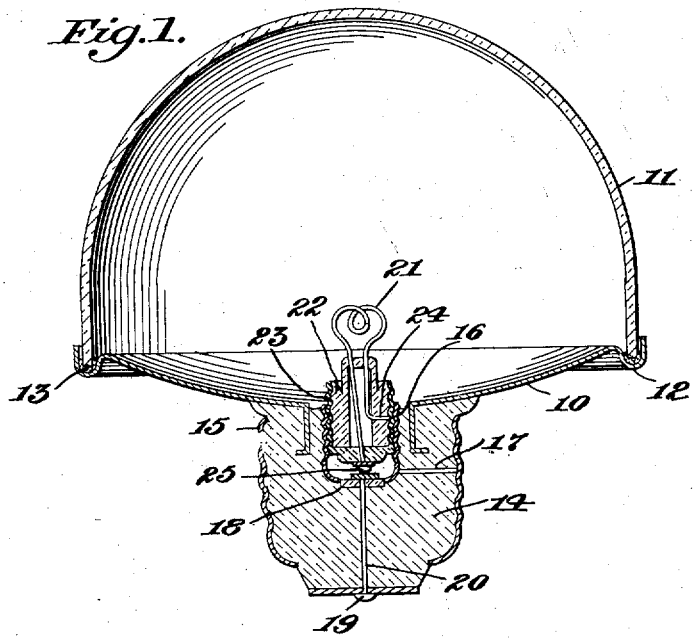

The above and other objects may be attained by constructing the improved incandescent lamp in the manner illustrated in the accompanying drawing, in which:

Figure 1 is a longitudinal sectional view of the improved incandescent lamp, showing the manner of detachably mounting the filament therein; and Fig. 2, a similar view, showing the filament replaced by a small bulb.

Similar numerals refer to similar parts throughout the drawing.

The improved incandescent lamp to which the invention pertains may include a reflector 10 preferably slightly concaved, as shown in the drawing, and adapted to form the rear portion of the lamp bulb, a glass or transparent medium 11 being detachably connected to the peripheral portion of the reflector, the joint between the reflector and glass or transparent medium being sealed with any suitable material to provide an air-tight joint whereby a vacuum may be maintained within the transparent medium 11 or suitable gas may be contained therein as is customary in ordinary practice.

In order to connect the glass or transparent medium to the reflector, a peripheral groove or channel 12 may be formed upon the reflector to receive the edge portion of the transparent medium, any suitable sealing material such as indicated at 13 being used for providing an air-tight joint.

The central portion of the reflector may be secured to the insulation base 14 provided with the usual screw threaded shell 15 adapted to be inserted into the usual lamp socket. The inner end portion of the insulation base 14 is provided with a socket within which may be fixed a screw threaded tubular metal member 16 electrically connected with the shell 15, as shown at 17.

Within the bottom of this socket is provided a contact point 18, insulated from the tubular metal member 16 and electrically connected with the usual contact 19, at the end of the base 14, as shown at 20.

The filament 21 is adapted to be carried by a small base 22 surrounded by a screw threaded metal shell 23 adapted to be received in the threaded tubular member 16 located in the socket of the base 14. One end of the filament is electrically connected to the shell 23, as shown at 24, the other end thereof being connected to the contact 25 which contacts with the contact 18, thus completing the circuit through the filament when the base 14 is screwed into a lamp socket.

When the filament 21 burns out it may be replaced by a new filament by removing the glass or transparent medium 11 from the reflector 10, and after the new filament has been inserted the transparent medium 11 is replaced upon the reflector and sealed, the air being exhausted from the transparent medium, which, if desired, may then be filled with a suitable gas as in ordinary practice.

If desired, the user may himself repair the lamp without returning it to the factory for insertion of a new filament as above described. This may be done by removing the glass or transparent medium 11 from the reflector and removing the filament, a small bulb of any usual and well known design, as shown generally at 26, being inserted into the socket of the base 14, after which the glass or transparent medium 11 may be replaced upon the reflector 10, as shown in Fig. 2.

With a lamp of this construction an increased lighting capacity is obtained with the consumption of a small amount of current. While such lamps may be used for any purpose for which incandescent lamps are adaptable, they are especially advantageous for use in electric signs. For such purpose it will be seen that, the reflector being entirely enclosed and protected from the elements, as well as from dirt and dust, the efficiency of the lamp will not be impaired by long use out of doors.

It will be readily perceived that when it is desired to utilize this particular construction of lamp in connection with certain types of signs and signals, where the reflector is properly enclosed and protected, the glass or transparent medium 11 may be omitted or dispensed with, without affecting or impairing its efficiency or advantages.

Having thus described my invention, what I claim and desire to secure by Letters Patent is:

1. An incandescent lamp of the character described, having a base filled with insulation having a socket at its inner end, a reflector fixedly and centrally secured within said insulation provided with a peripheral groove, a glass globe mounted within said groove and sealed within the groove to provide an air-tight joint, and a filament detachably disposed within said socket.

2. An incandescent lamp of the character described, having a base filled with insulation having a socket at its inner end, a saucer-shaped reflector centrally and fixedly secured within said insulation provided with a peripheral groove, a glass globe connected within the groove and sealed therein to provide an air-tight joint, and a filament detachably disposed within said socket and extending within the globe.

3. An incandescent lamp of the character described, having a base filled with insulation formed with a socket at its inner end, a dished reflector fixedly and centrally secured within the insulation provided with a peripheral groove around its peripheral portion and an upright rim, a glass globe detachably mounted within said groove and sealed in the groove, and a filament detachably connected to the base within said socket and extending within the globe.

4. An incandescent lamp of the character described, having a base filled with insulation, a reflector centrally and fixedly secured within the insulation provided with a groove around its peripheral portion and an upright rim formation, a glass globe detachably mounted within said groove and rim sealed therein at its peripheral edge, and an incandescent bulb detachably connected to the base and extending within the globe.

5. An incandescent lamp of the character described, having a base filled with insulation formed with a socket at its inner end, a reflector carried by the base, and provided with a peripheral groove around its peripheral portion and a rim, a transparent medium detachably mounted within said groove sealed at its peripheral edge, and an incandescent bulb detachably connected to the base and completely inclosed by the reflector and transparent medium.

6. An incandescent lamp of the character described, having a base filled with insulation, a reflector centrally and fixedly secured within the insulation with a groove around its peripheral portion, a glass detachably mounted within said groove and an incandescent bulb detachably connected to the base and extending into the reflector.

7. An incandescent lamp of the character described, having a base filled with solid insulation, said insulation being provided with a socket formed at its upper central portion, a metal member disposed on the outer surface of the base and a metal member disposed within the socket, said members being electrically connected, a reflector having a central rearwardly projecting portion fixedly secured within the solid insulation between the two metal members, said reflector being in contact with the upper surface of the insulation, and an incandescent bulb fitted within the socket and extending into said reflector.

EMANUEL C. SMALLY.